United States Patent
Takahashi

(10) Patent No.: US 9,025,175 B2
(45) Date of Patent: May 5, 2015

(54) STORAGE MEDIUM, INFORMATION PROCESSING APPARATUS, AND CONTROL METHOD

(71) Applicant: Canon Kabushiki Kaisha, Tokyo (JP)

(72) Inventor: Masakazu Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 13/767,565

(22) Filed: Feb. 14, 2013

(65) Prior Publication Data
US 2013/0215445 A1   Aug. 22, 2013

(30) Foreign Application Priority Data
Feb. 20, 2012   (JP) .................... 2012-034347

(51) Int. Cl.
*G06K 15/00* (2006.01)
*G06F 11/30* (2006.01)
*G06F 3/12* (2006.01)

(52) U.S. Cl.
CPC .......... *G06F 3/1297* (2013.01); *G06F 11/3013* (2013.01); *G06F 11/3068* (2013.01)

(58) Field of Classification Search
CPC ... G06F 3/1207; G06F 3/1214; G06F 3/1288; G06F 3/1259; G06F 3/1229; G06F 3/1294; G06F 3/1205; G06F 3/1284; G06F 3/1285; G06F 3/1255; H04N 1/00344

USPC .............. 358/1.1, 2.1, 1.11–1.18, 504, 406; 710/8–19
See application file for complete search history.

(56) References Cited

U.S. PATENT DOCUMENTS

| | | | |
|---|---|---|---|
| 2003/0043406 A1* | 3/2003 | Wells et al. ................. | 358/1.15 |
| 2006/0256372 A1* | 11/2006 | Suzuki ........................ | 358/1.15 |
| 2006/0259549 A1* | 11/2006 | Huang ......................... | 709/203 |
| 2007/0008579 A1* | 1/2007 | Kawasaki .................... | 358/1.15 |
| 2007/0182978 A1* | 8/2007 | Nakamura et al. .......... | 358/1.13 |
| 2008/0225334 A1* | 9/2008 | Hamada et al. ............. | 358/1.15 |
| 2009/0265482 A1* | 10/2009 | Abe et al. .................... | 710/8 |
| 2011/0116131 A1* | 5/2011 | Mitsui ......................... | 358/1.15 |

FOREIGN PATENT DOCUMENTS

JP   2007-11469 A   1/2007

* cited by examiner

*Primary Examiner* — Chad Dickerson
(74) *Attorney, Agent, or Firm* — Canon USA Inc IP Division

(57) ABSTRACT

In a case where a parameter received from an application is a first parameter, an information processing apparatus receives data included in the parameter as string type data, converts the received data into binary data, and transmits the converted data to a printing apparatus. In a case where the received parameter is a second parameter, the information processing apparatus transmits data corresponding to the second parameter to the printing apparatus.

12 Claims, 13 Drawing Sheets

FIG. 8

```xml
<?xml version='1.0'?>
<Schema xmlns="http://schemas.microsoft.com/windows/2010/09/printing/usbbidi">
  <Property name="Printer">
    <Property name="Maintenance">
      <Property name="Command">
        <Value name="TypeA" type="BIDI_BOOL"accessType="Set"/>
      </Property>
      <Property name="Direct">
        <Value name="TypeB" type="BIDI_STRING"accessType="Set"/>
      </Property>
    </Property>
  </Property>
</Schema>
```

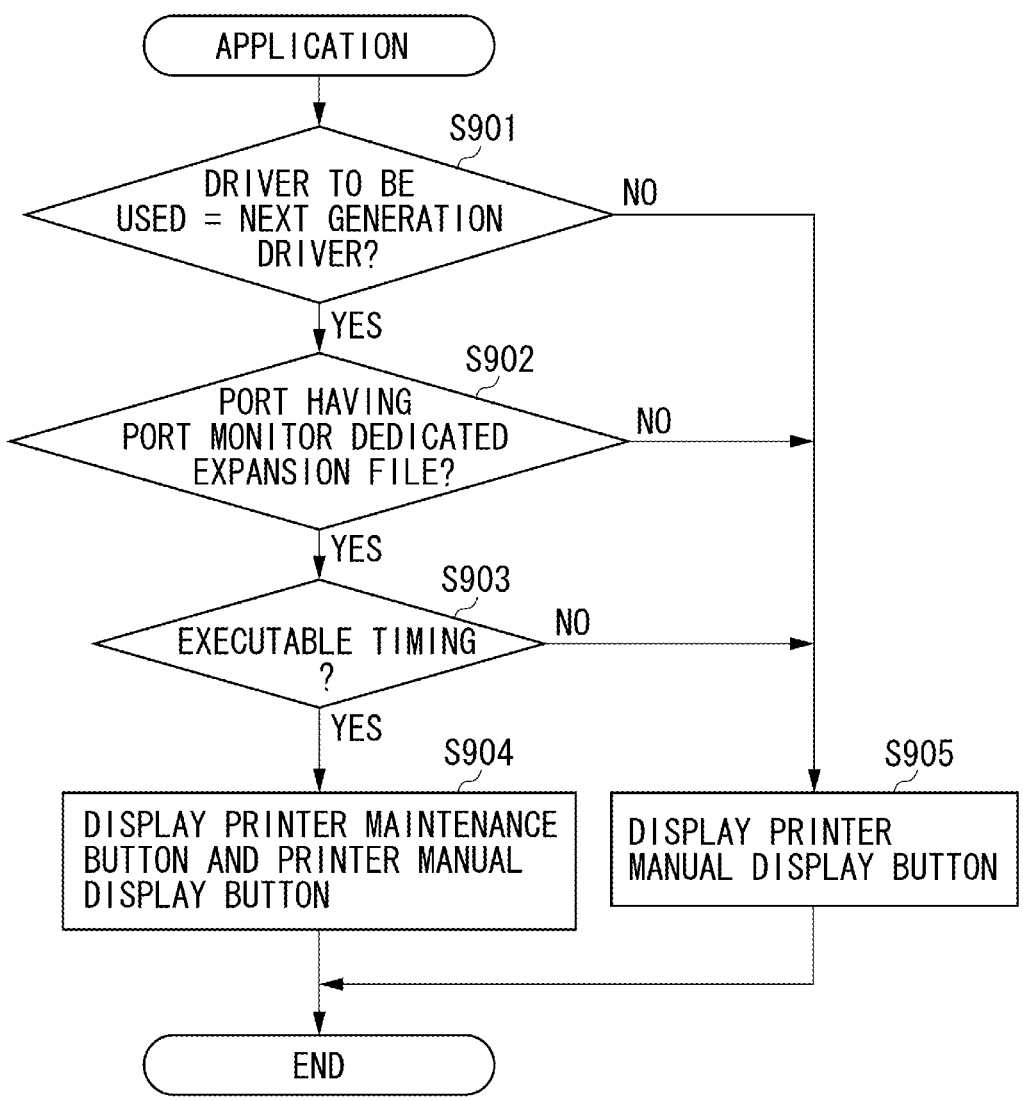

FIG. 10
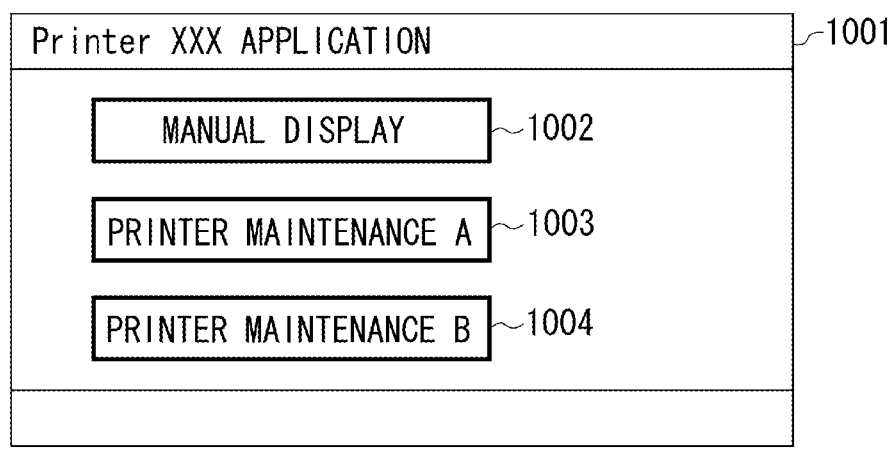
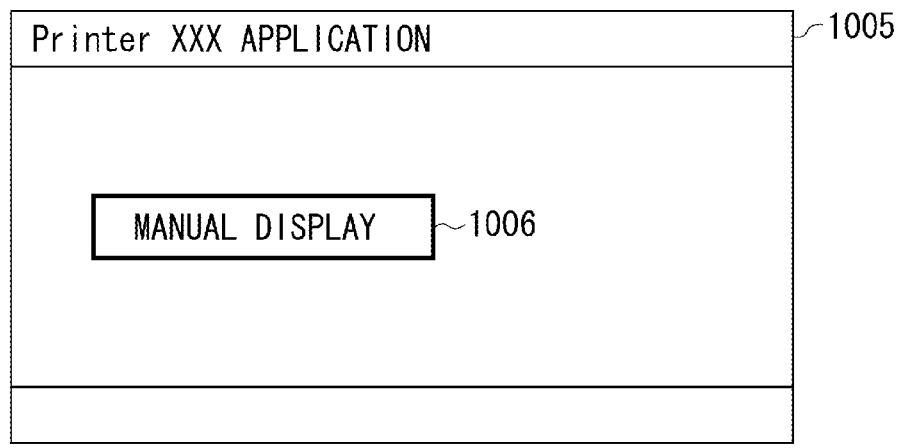
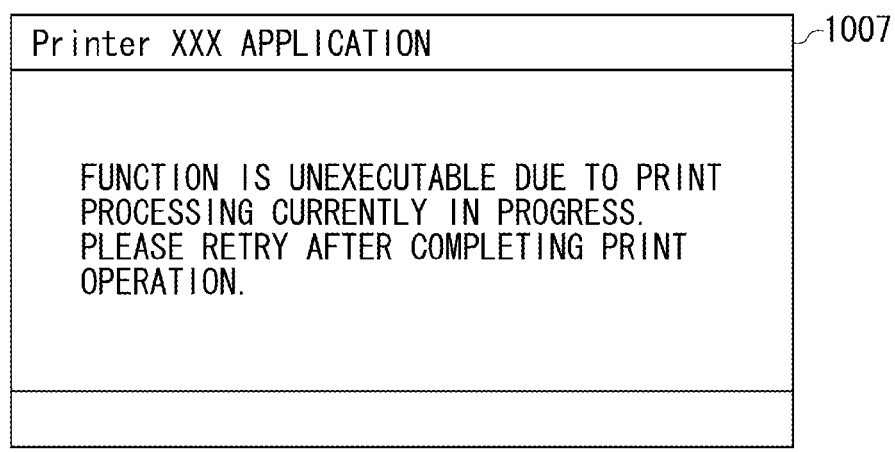

FIG. 11
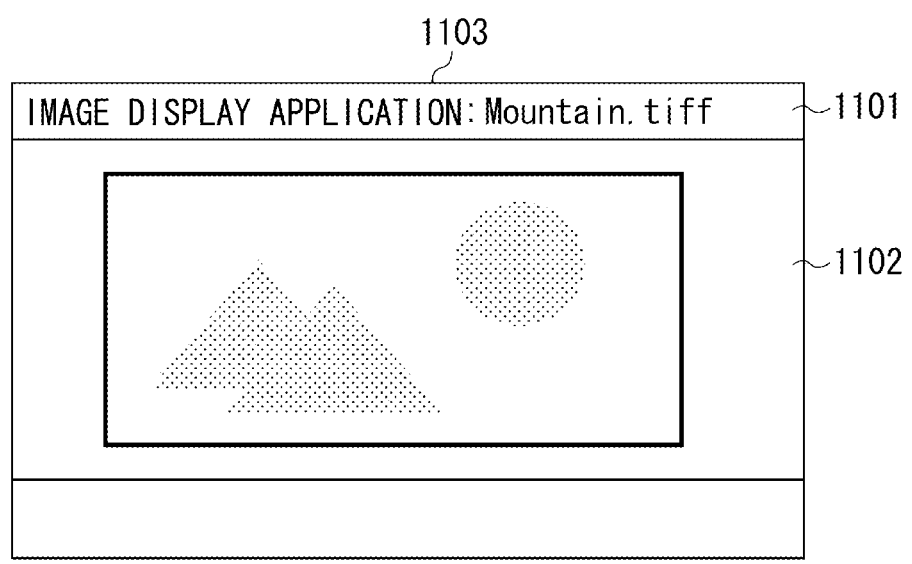
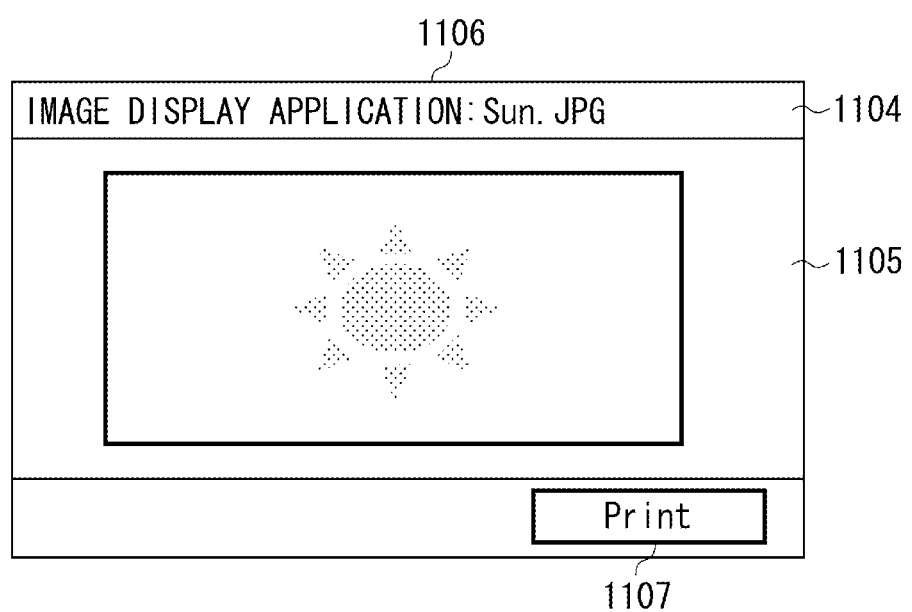

STORAGE MEDIUM, INFORMATION PROCESSING APPARATUS, AND CONTROL METHOD

BACKGROUND

1. Field Disclosure

Aspect of the present invention relates to a technique capable of realizing reception/transmission of a parameter between programs.

2. Description of the Related Art

As discussed in Japanese Patent Application Laid-Open No. 2007-11469, to perform a maintenance operation for a printer, it is conventionally feasible to use a spooler to transmit a maintenance command that causes the printer to execute a maintenance function, as a maintenance job, to the printer.

In a case where an application or a printer driver operates in an environment that is different from the environment discussed in the Japanese Patent Application Laid-Open No. 2007-11469, a method that is similar to the method discussed in the Japanese Patent Application Laid-Open No. 2007-11469 may not be effective to enable an information processing apparatus and a printer to appropriately transmit and receive data. Accordingly, it is desired to take various measures to enable the information processing apparatus and the printer to appropriately transmit and receive data in the above-described different environment.

SUMMARY

According to an aspect of the claimed invention, a computer readable non-transitory storage medium stores a program that causes a computer to operate as a conversion unit configured to convert string type data included in a first parameter into binary data, and a transmission unit configured to instruct transmitting the binary data converted by the conversion unit to a printing apparatus in a case where a parameter received from an application is the first parameter and configured to instruct transmitting data that corresponds to a second parameter, which is different from the first parameter, to the printing apparatus in a case where the parameter received from the application is the second parameter, wherein, in a case where a function to be executed by the application is a first function, the application converts the binary data including data outside of an area of the string type data into the string-type data and sets converted data to the first parameter, and transmits the first parameter and further, in a case where the function to be executed by the application is a second function that is different from the first function, the application transmits the second parameter that corresponds to the second function.

Further features and aspects of the claimed invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of an expansion schema definition file 413 according to the first exemplary embodiment.

FIG. 9 is a flowchart illustrating example processing to be performed to display a main screen when the next generation application 401 is launched, as a modified example, according to the first exemplary embodiment.

FIG. 10 illustrates a modified example of the UI screen of the next generation application 401 according to the first exemplary embodiment.

FIG. 11 illustrates an example screen configuration of a next generation application 401 that displays an image file.

DESCRIPTION OF THE EMBODIMENTS

Various exemplary embodiments, features, and aspects of the claimed invention will be described in detail below with reference to the drawings.

The following exemplary embodiments do not intend to limit the scope of the claimed invention. Further, the invention should not be construed as requiring all of combinations of characteristic features described in the following exemplary embodiments.

Figure 1:
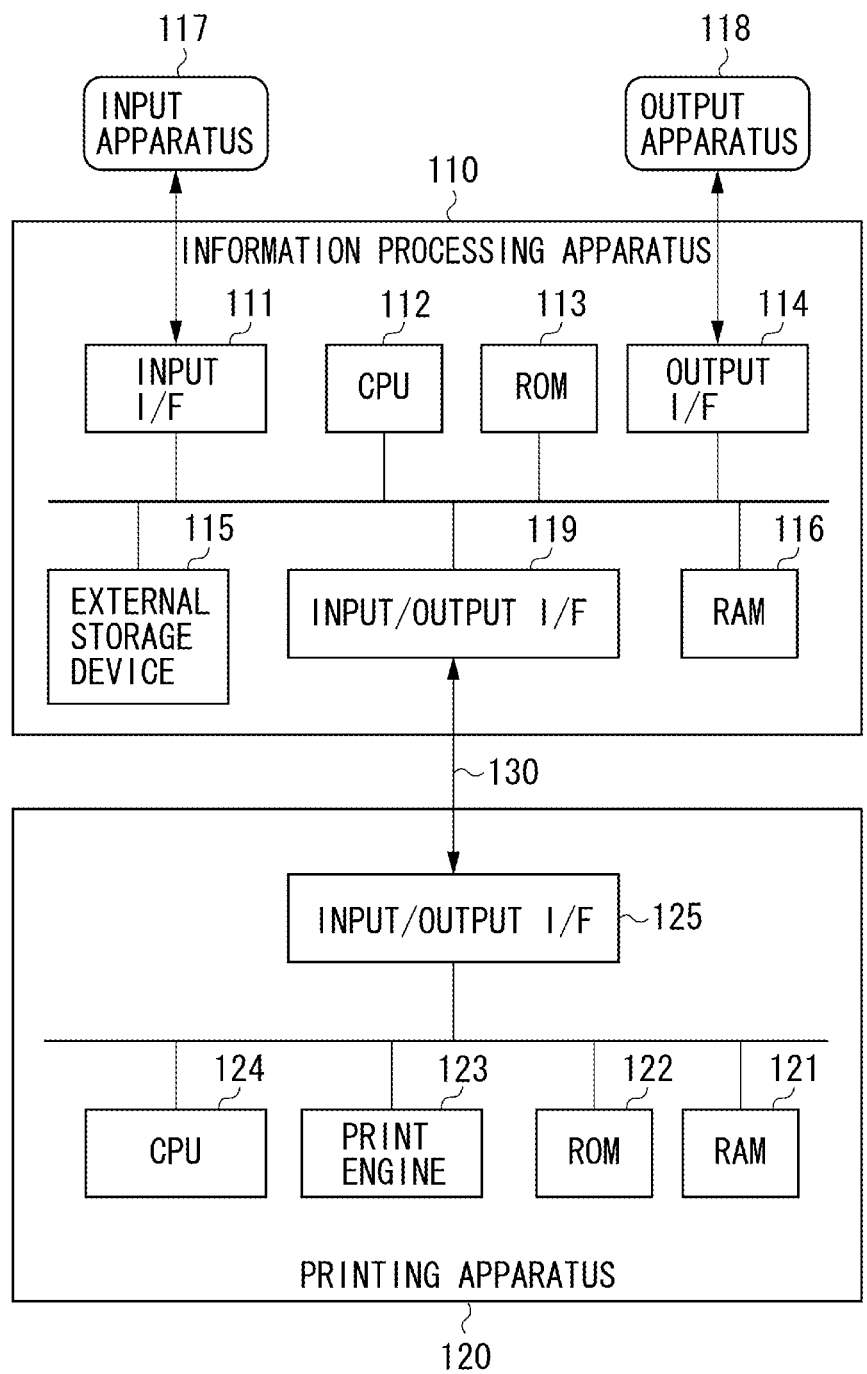
FIG. 1 is a block diagram illustrating a printing system that includes a printing apparatus and an information processing apparatus connected to each other.

FIG. 1 is a block diagram illustrating an example of the entire configuration of a printing system that includes an information processing apparatus 110 and a printing apparatus 120 connected to each other.

The information processing apparatus 110 illustrated in FIG. 1 can be constituted by a general personal computer (PC) that has the following hardware configuration. An operating system (OS) installed on the information processing apparatus 110 is, for example, Windows (registered trademark) 7, which has been provided by Microsoft Corporation. The operating system (OS) to be installed on the information processing apparatus 110 is not limited to the above-described type.

The information processing apparatus 110 includes an input interface (I/F) 111, a central processing unit (CPU) 112, a read only memory (ROM) 113, an output I/F 114, an external storage device 115, a random access memory (RAM) 116, an input apparatus 117, an output apparatus 118, and an input/output I/F 119. The ROM 113 stores an initialization program. The external storage device 115 stores the OS, a printer driver, and other data.

Each program stored in the external storage device 115 can use the RAM 116 as a work memory.

The input apparatus 117, which enables a user to input various data and operational instructions, is connected to the input I/F 111.

The output apparatus 118, which can display various data and notify operational states, is connected the output I/F 114.

The printing apparatus 120 includes a RAM 121, a ROM 122, a print engine 123, a CPU 124, and an input/output I/F 125.

A universal serial bus (USB) (registered trademark) cable 130 connects the information processing apparatus 110 and the printing apparatus 120 to enable these apparatuses to perform bidirectional communications.

A representative communication interface of the information processing apparatus 110 is a conventionally known USB interface. However, the communication interface of the information processing apparatus 110 is not limited to the USB interface. For example, a wireless communication interface is usable. Further, it is useful to use a local area network (LAN) interface via a Centronics interface or an Ethernet.

The RAM 121 is usable as a work memory for the CPU 124 and can serve as a storage buffer that temporarily stores received data. The ROM 122 stores control commands. The print engine 123 performs printing based on the data stored in the RAM 121.

The CPU 124 can control the printing apparatus 120 according to the control commands stored in the ROM 122.

In the present exemplary embodiment, the processing to be performed by each of the information processing apparatus 110 and the printing apparatus 120 is not limited to the above-described example.

An example print data flow using a legacy architecture based printer driver (hereinafter, referred to as a legacy driver (i.e., one of conventional printing systems)), an example flow of maintenance execution processing realized on the architecture, and an example method for performing bidirectional communications between an application and a printing apparatus are described below with reference to FIGS. 2 and 3.

Figure 2:
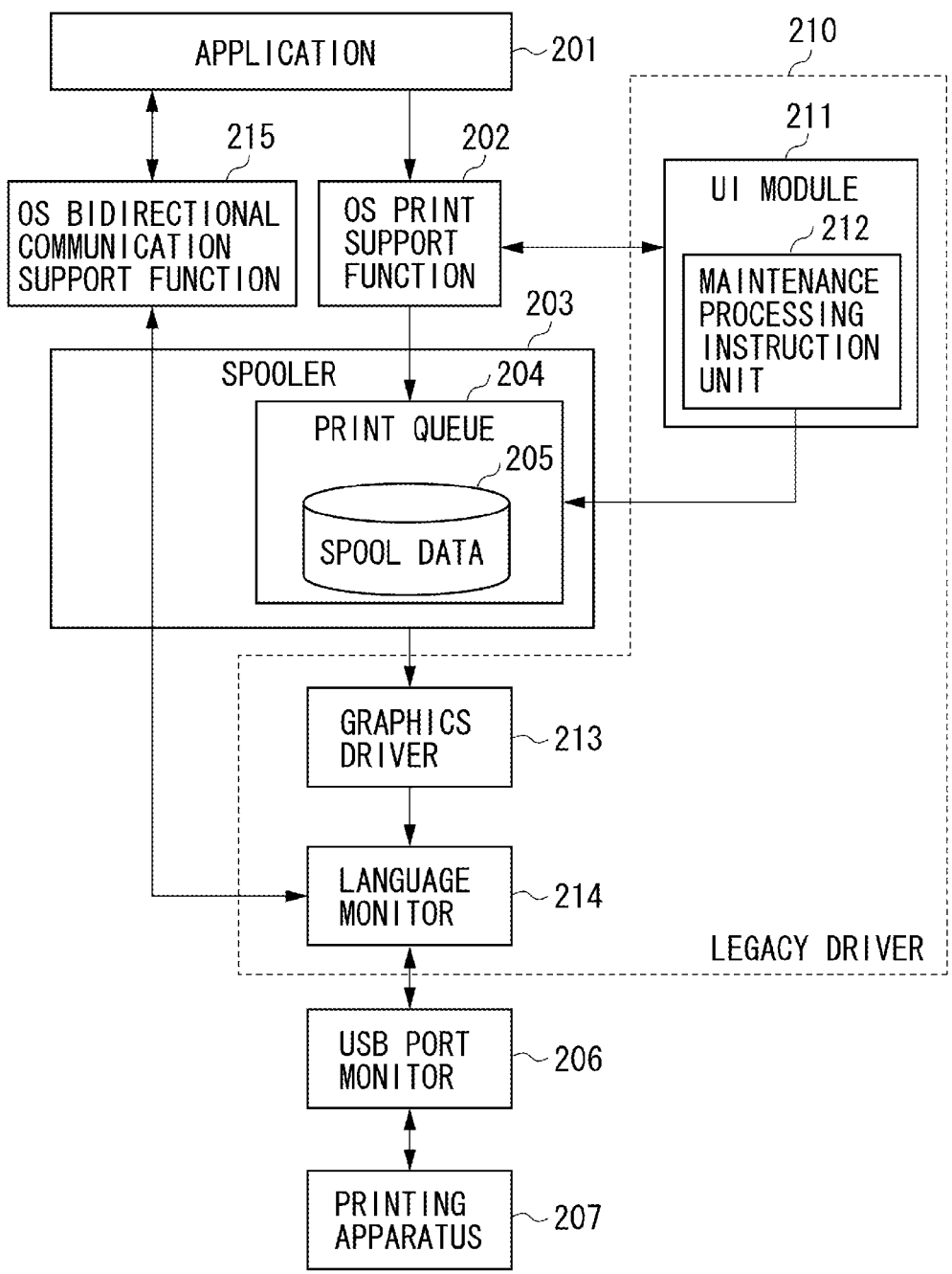
FIG. 2 is a block diagram illustrating an example configuration of a legacy architecture printer driver.

FIG. 2 is a block diagram schematically illustrating the legacy driver, as a conventional printing system, which is applicable to the information processing apparatus 110.

An application 201 generates print data. A user interface (UI) module 211 sends print setting information to an OS print support function 202. The print setting information is added to the print data and is then temporarily stored as spool data 205 in a print queue 204 of a spooler 203.

A legacy driver 210 can convert the spool data 205 into a print command that can be interpreted by a printing apparatus 207 (which has a configuration similar to that of the printing apparatus 120). Then, the legacy driver 210 outputs the converted print command to a USB port monitor 206.

The legacy driver 210 includes a graphics driver 213 and a language monitor 214 in addition to the above-described UI module 211.

The USB port monitor 206 can transmit the input print command to the printing apparatus 207.

When the printing apparatus 207 receives the print command, the printing apparatus 207 performs printing based on the received print command. More specifically, each of 8-bit RGB data having been rasterized by the graphics driver 213 is converted into 32-bit CMYK data and subjected to quantization processing. Further, the printer interprets the processed print command and performs printing based on the print command.

In the present exemplary embodiment, the UI module 211 can include a maintenance processing instruction unit 212 configured to instruct the printing apparatus 207 to perform a maintenance operation.

The UI module 211 provides a UI screen that enables a user to select a maintenance operation. In response to the instruction from the user, the printing apparatus 207 performs the maintenance operation.

Further, the application 201 can use an OS bidirectional communication support function 215, which causes the language monitor 214 of the legacy driver 210 to perform bidirectional communications with the printing apparatus 207 via the USB port monitor 206 to display status information of the printing apparatus 207.

The OS bidirectional communication support function 215 is not described in detail below because it is the function described in the Microsoft Developer Network (hereinafter, referred to as MSDN). For example, the OS bidirectional communication support function 215 is the "bidirectional printer communication", which can transmit and receive status information to and from the printing apparatus 207 via setting information, which is referred to as "bidi schema", using a bidi spooler API.

Figure 3:
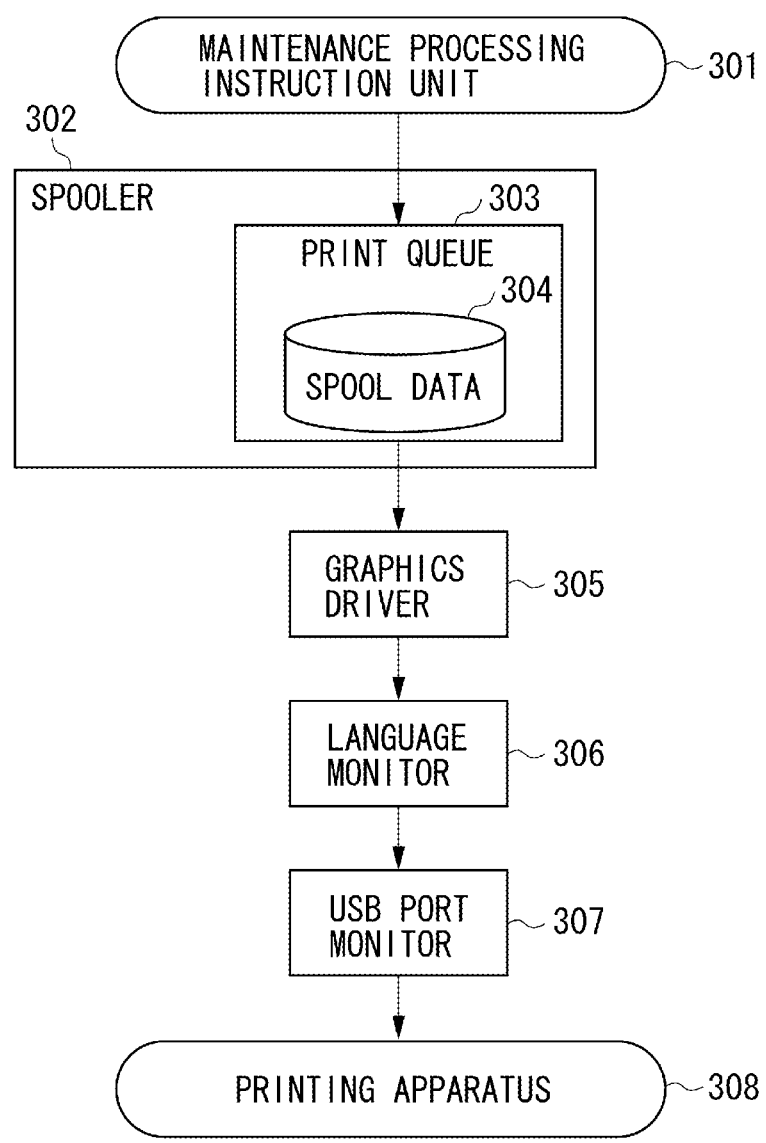
FIG. 3 is a block diagram illustrating an example flow of maintenance execution processing that can be performed by the legacy architecture printer driver.

FIG. 3 is a block diagram illustrating an example flow of the maintenance execution processing that can be performed by the legacy driver 210.

A maintenance processing instruction unit 301 (i.e., 212 in FIG. 2) included in the UI module 211 generates a maintenance control command, which can be interpreted by a printing apparatus 308, according to a user instruction. The maintenance processing instruction unit 301 transmits the generated maintenance control command to a spooler 302.

In the present exemplary embodiment, the maintenance control command is a Binary type execution instruction command. The printing apparatus 308 performs an operation in response to the Binary type control command.

The Print Spooler API described in the MSDN is generally usable as an example method for transmitting the maintenance control command to the spooler 302.

Although not described in detail, the following is an example of the above-described transmission method. The example method includes identifying the printing apparatus 308 (i.e., the transmission target) using the OpenPrinter function, starting a print job using the StartDocPrinter function and the StartPagePrinter function, writing the maintenance control command using the WritePrinter function, and completing the print job using the EndPagePrinter function and the EndDocPrinter function. Thus, the maintenance control command can be transmitted, as the print job, to the printing apparatus 308, via the spooler 302.

The spooler 302 temporarily stores the received maintenance control command, as spool data 304, in a print queue 303.

The print queue 303 outputs the spool data 304 to a USB port monitor 307 via a graphics driver 305 and a language monitor 306.

The print queue 303 may directly output the spool data 304, although it depends on the type of the spool data 304, to the USB port monitor 307 via the language monitor 306 while skipping the graphics driver 305.

In the present exemplary embodiment, when the maintenance control command is input to the graphics driver 305, the maintenance control command has a format that can be interpreted by the printing apparatus 308. Therefore, it is unnecessary for the graphics driver 305 to perform the above-described conversion processing on the input maintenance control command.

Therefore, the maintenance processing instruction unit 301 describes information indicating the necessity of the conversion processing in a job to be sent to the spooler 302 through maintenance command issuance processing. The graphics driver 305 controls a conversion operation according to the information indicating the necessity of the conversion processing.

The USB port monitor 307 transmits the input maintenance control command to the printing apparatus 308 to execute the maintenance operation.

Next, a first exemplary embodiment of the present invention is described below with reference to FIG. 4 to FIG. 8.

In the present exemplary embodiment, a port monitor dedicated expansion file and an expansion schema definition file are usable. The port monitor dedicated expansion file can be used by a next generation architecture based printer driver (hereinafter, referred to as "next generation driver").

The port monitor dedicated expansion file described in the present exemplary embodiment is dedicated to the USB port monitor. However, it is needless to say that a similar configuration is employable for any other port if the port monitor dedicated expansion file is operable.

Figure 4:
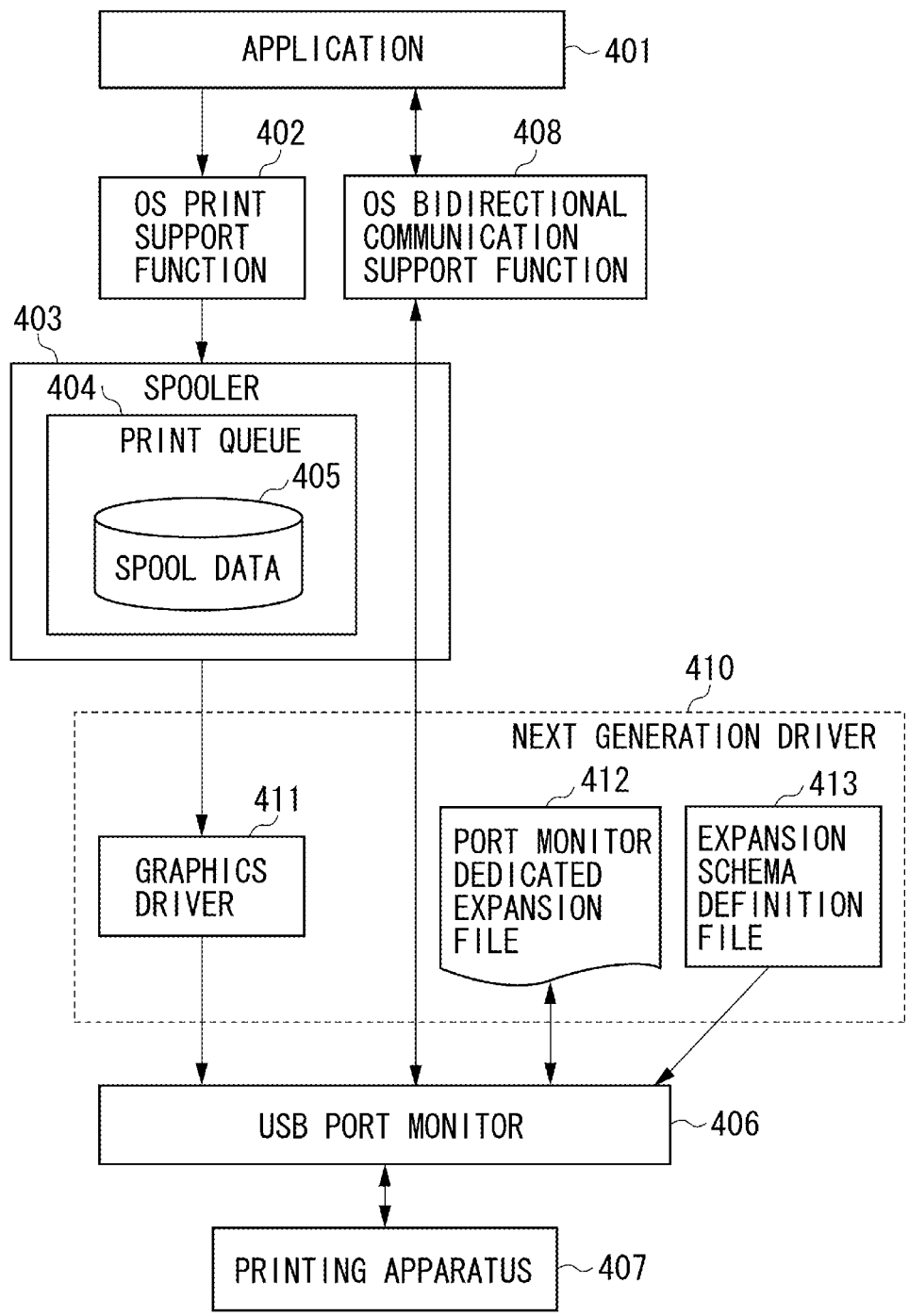
FIG. 4 is a block diagram illustrating an example configuration of a next generation architecture based printer driver.

FIG. 4 is a block diagram schematically illustrating a next generation driver that can be applied to the information processing apparatus 110, which is a printing system having a configuration different from that of the legacy driver 210.

An example processing flow of ordinary print processing is described below. An application 401 can generate print data and send the generated print data to a spooler 403 via an OS print support function 402. The spooler 403 temporarily stores the generated print data, as spool data 405, in its print queue 404.

A graphics driver 411 can convert the spool data 405 into a print command that can be interpreted by a printing apparatus 407.

The graphics driver 411 can send the generated print command to the printing apparatus 407 via a USB port monitor 406.

A file group illustrated in FIG. 4 is a group of files that cooperatively constitute a next generation driver 410.

Constituent components of the next generation driver 410 applicable to a new OS according to an aspect of the present invention do not include the UI module 211 and the language monitor 214 (i.e., some of the constituent components of the legacy driver 210).

It is necessary for the next generation driver 410 to use the UI module prepared by the OS to perform various settings (including print settings), although it is sufficient to perform basic print settings. Thus, the next generation driver 410 cannot have a unique graphic user interface (GUI) dedicated to a multi-functional printer vendor.

However, the external application 401 (hereinafter, referred to as "next generation application") associated with the next generation driver 410 can provide a GUI that enables a user to perform various settings.

The OS functions that can be used by the next generation application 401 are limited. For example, the maintenance control command, which can be used by the UI module 211 of the legacy driver 210, may not be spooled as a print job.

Further, although the next generation driver 410 does not include the language monitor 214 of the legacy driver 210, a port monitor dedicated expansion file 412 is prepared, as a new constituent component, to enable the next generation application 401 to perform bidirectional communications with the printing apparatus 407.

The port monitor dedicated expansion file 412 can be provided as a constituent component of the next generation driver 410. The port monitor dedicated expansion file 412 is a script file that is described using the JavaScript (registered trademark) and is capable of enhancing the OS functions. Further, the port monitor dedicated expansion file 412 is a script file that is invoked and executed by the USB port monitor 406 executed by the CPU 112 when the next generation application 401 performs bidirectional communications using the OS functions. The port monitor dedicated expansion file 412 can acquire information from the printing apparatus 407 and can transmit information to the printing apparatus 407.

Although the expansion file described in the present exemplary embodiment is dedicated to the USB port monitor, it is apparent that the port is not limited to the USB port if the port monitor is compatible with the expansion file and its configuration is usable as a configuration of the next generation driver 410.

Further, in the present exemplary embodiment, a port monitor expansion file is described as a script file. However, for example, if it can be provided as a dynamic link library and the next generation driver 410 is configured to enable the port monitor to load and use the port monitor expansion file 412, the port monitor expansion file is operable. Therefore, the port monitor expansion file is not limited to the script file.

The next generation application 401 can use an OS bidirectional communication support function 408 to perform bidirectional communications with the printing apparatus 407. The next generation application 401 can perform bidirectional communications with the printing apparatus 407 using a schema defined in the expansion schema definition file 413 and the port monitor dedicated expansion file 412 described using the script.

It is feasible to set a schema to the parameter to be used to perform reception/transmission of information when the next generation application 401 performs bidirectional communications via the port monitor dedicated expansion file 412. The schema includes a value (Value) and a schema path that corresponds to the value (Value). The schema described in the following description indicates the schema included in the parameter.

The port monitor dedicated expansion file 412 can be invoked from the USB port monitor 406 via the spooler 403 when the next generation application 401 uses the Get function of the Bidi Printer communication. The port monitor dedicated expansion file 412 can acquire status information, which has been returned from the printing apparatus 407 and stored in the schema, and can perform analysis processing on the acquired status information.

Further, the port monitor dedicated expansion file 412 can be invoked from the USB port monitor 406 via the spooler 403 when the next generation application 401 uses the Set function of the Bidi Printer communication. Subsequently, the port monitor dedicated expansion file 412 can acquire String type data involved in the schema having been stored by the application and can transmit the acquired data to the printing apparatus 407 via the USB port monitor 406.

In the present exemplary embodiment, Binary type information (i.e., binary data) cannot be processed as the Value of the schema involved in the parameter of the Bidi Printer communication. For example, in a case where external data outside of an area processible as the String type cannot be included in the Value, the binary data cannot be processed.

As described above, although the next generation application 401 cannot spool the maintenance control command as a print job, the next generation application 401 can perform bidirectional communications with the printing apparatus 407. Therefore, the Set function of the above-described port monitor dedicated expansion file 412 can be used to transmit the command to the printing apparatus 407.

Next, an example operation to be performed when the maintenance control command is actually transmitted from the next generation application 401 to the printing apparatus 407 is described below with reference to FIG. 5 to FIG. 8.

Figure 7:
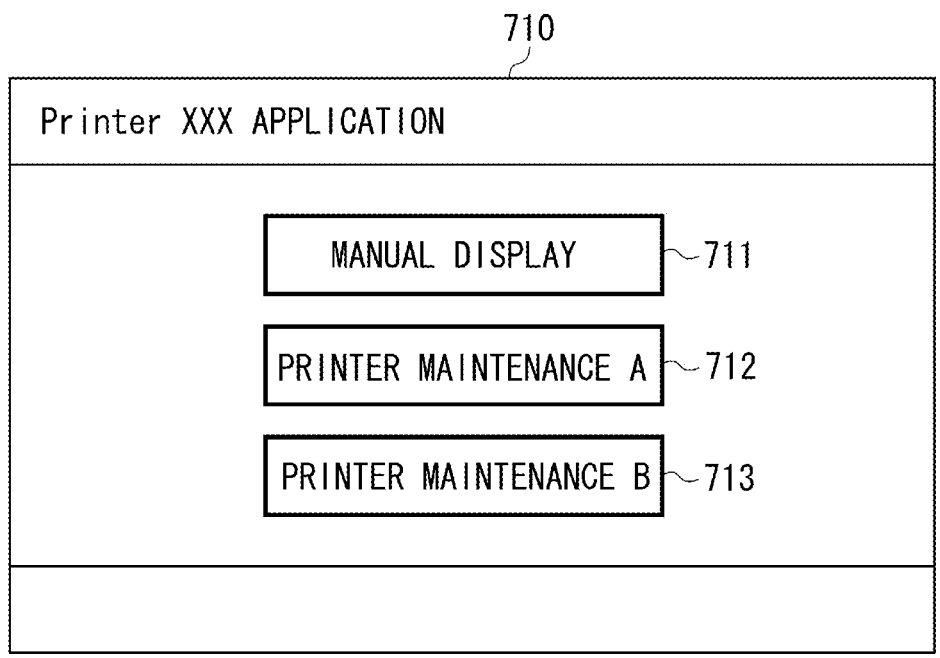
FIG. 7 illustrates an example UI screen of the next generation application 401 according to a first exemplary embodiment.

FIG. 7 illustrates an example UI screen of the next generation application 401.

The UI screen illustrated in FIG. 7 includes a main screen 710 that can be displayed immediately after the next generation application is launched. The main screen 710 can display a plurality of buttons to execute various functions.

A "manual display" button 711 is a button operable to display a text file including detailed descriptions relating to operations and functions of the printing apparatus 407. When the button 711 is executed by a user, the text file including the detailed descriptions relating to the operations and the functions of the printing apparatus 407 can be displayed on the main screen 710.

A "printer maintenance A" button 712 is a button operable to execute a printer maintenance function A. When the button 712 is executed by a user, the printer maintenance function A can be executed. A maintenance control command dedicated to the printer maintenance function A is described in the port monitor dedicated expansion file 412.

A "printer maintenance B" button 713 is a button operable to execute a printer maintenance function B. When the button 713 is executed by a user, the printer maintenance function B can be executed. A maintenance control command dedicated to the printer maintenance function B is not described in the port monitor dedicated expansion file 412. Therefore, the maintenance control command dedicated to the printer maintenance function B is stored in the next generation application 401.

The screen configuration illustrated in FIG. 7 is a mere example of the UI screen of the next generation application 401. Any other screen configuration is usable if it is appropriate.

FIG. 8 illustrates an example of the expansion schema definition file 413, which includes descriptions of XML markup languages.

According to the definition of a printer maintenance function A dedicated schema illustrated in FIG. 8, the ValueType is BIDI_BOOL type, the accessType is Set, and the schema path is ¥¥Printer.Maintenance.Command:TypeA.

According to the definition of a printer maintenance function B dedicated schema illustrated in FIG. 8, the ValueType is BIDI_STRING type, the accessType is Set, and the schema path is ¥¥Printer.Maintenance.Direct:TypeB.

The number of schemata displayed in FIG. 8 is equal to the number of the maintenance functions illustrated in FIG. 7, which can be supported by the next generation application 401. However, it is needless to say that a sufficient number of schemata are prepared beforehand according to any other functions. For example, it may be necessary to define a status acquisition schema.

Further, the maintenance function B dedicated schema path has a name that suggests direct transmission of the maintenance control command. However, the name of the schema path can be freely determined.

Figure 5:
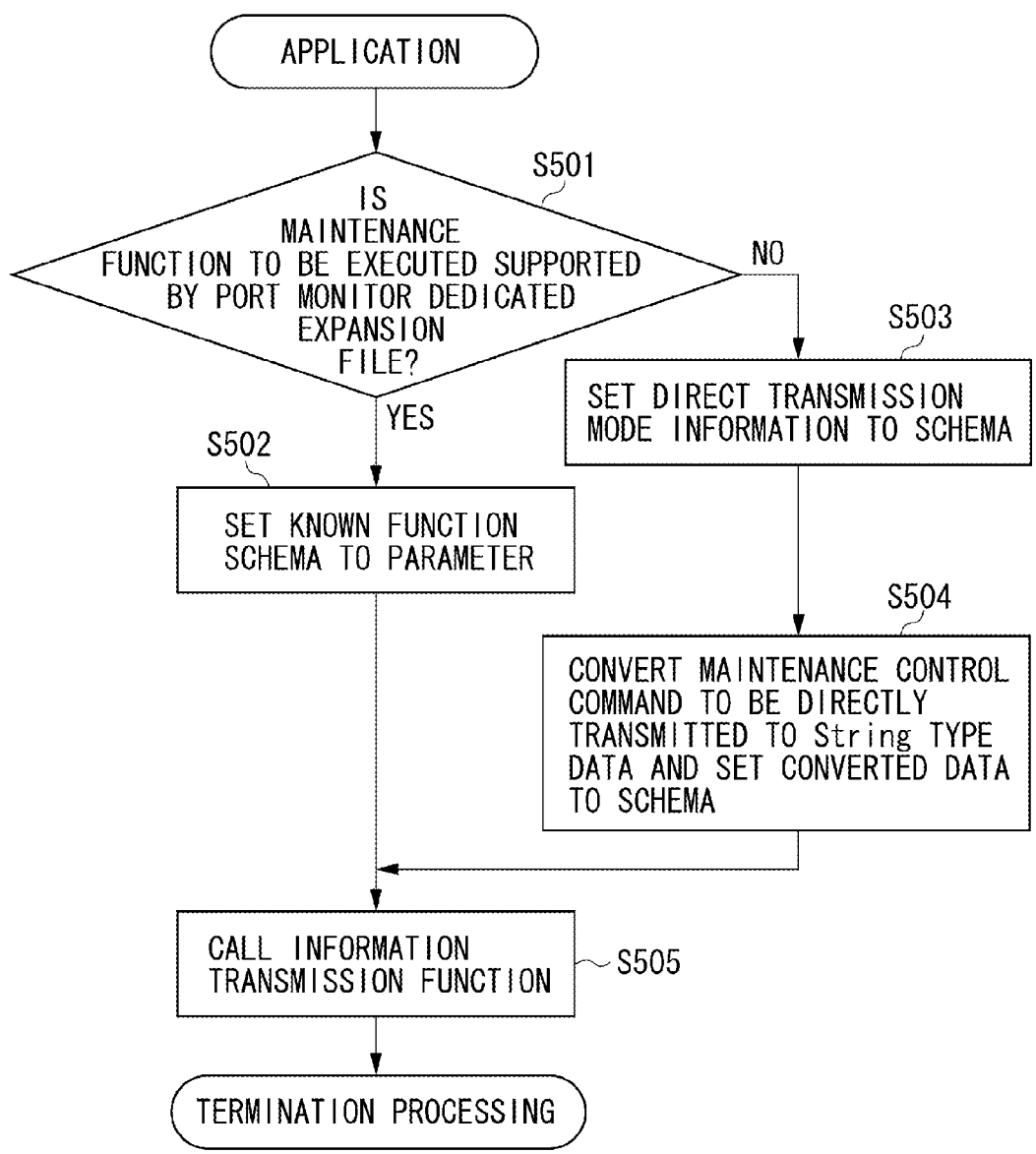
FIG. 5 is a flowchart illustrating an example flow of processing to be performed in response to an execution of a maintenance function button in a next generation application 401.

FIG. 5 is a flowchart illustrating an example flow of processing to be performed in response to execution of a maintenance function button in the next generation application 401.

To realize the processing of each step in the flowchart to be performed by the next generation application 401, the CPU 112 executes processing according to the program stored in the external storage device 115.

Figure 6:
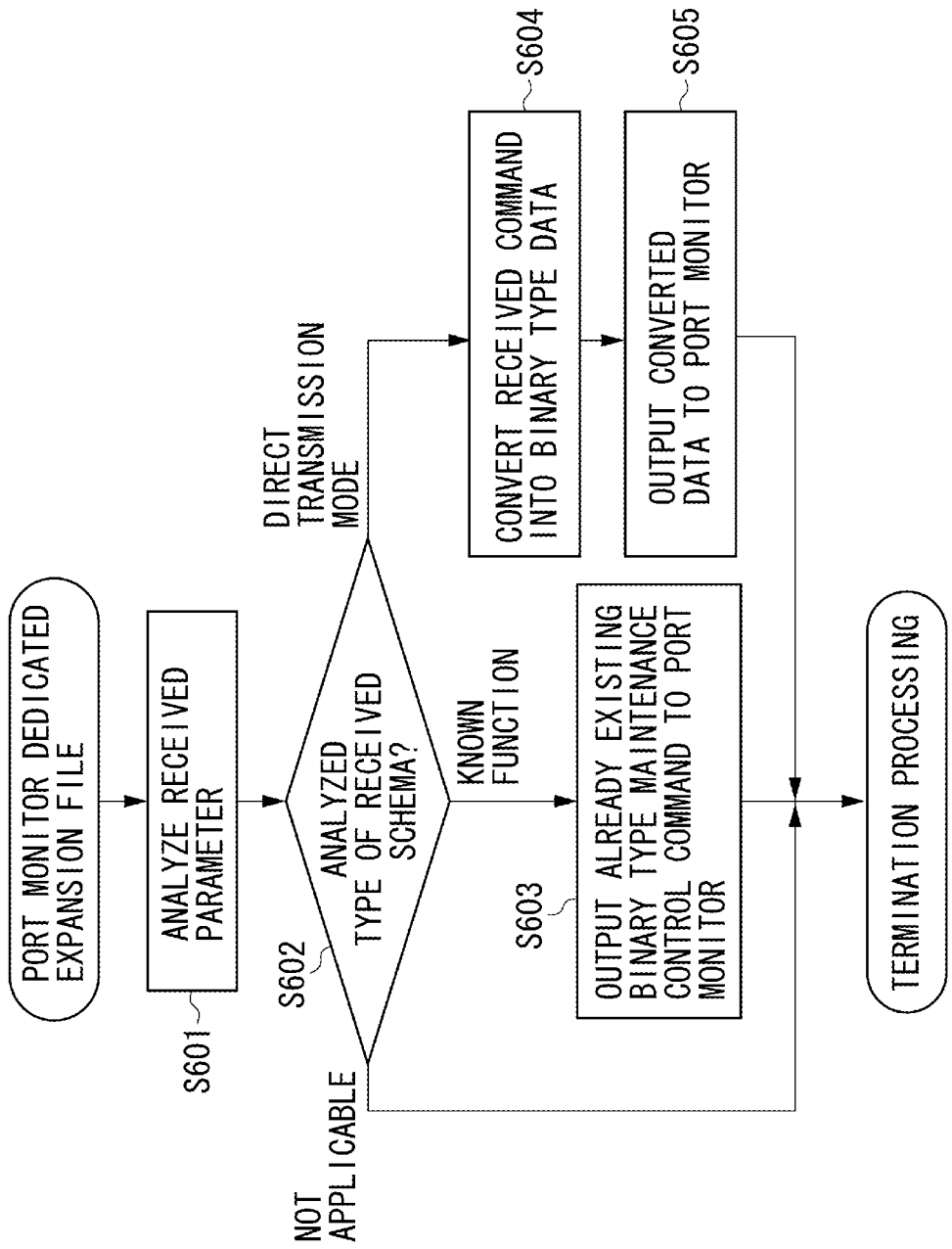
FIG. 6 is a flowchart illustrating an example flow of processing that can be performed by a port monitor dedicated expansion file 412, which is invoked when the next generation application 401 calls an information transmission function.

FIG. 6 is a flowchart illustrating an example flow of processing that can be performed by the port monitor dedicated expansion file 412, which is invoked when the next generation application 401 calls an information transmission function.

An example flow of processing to be performed when the next generation application 401 executes the printer maintenance functions of the button 712 and the button 713 is described below with reference to the flowcharts illustrated in FIG. 5 and FIG. 6.

<Processing Relating to the Printer Maintenance Function A that can be Performed by the Next Generation Application>

If the button 712 is executed, then in step S501, the next generation application 401 determines whether the maintenance function to be executed is supported by the port monitor dedicated expansion file 412. When the maintenance function to be executed is the maintenance function A of the button 712 (YES in step S501), a Binary type maintenance control command is described beforehand in the port monitor expansion file 412. Therefore, the operation proceeds to step S502.

The determination in step S501 can be realized by determining whether the button instructed by a user is the button 712 or the button 713.

In step S502, the next generation application 401 sets the printer maintenance function A dedicated schema to the parameter. Then, the operation proceeds to step S505. The schema path of the printer maintenance function A dedicated schema includes an input of information indicating invoking an already known function of the port monitor expansion file 412.

In the present exemplary embodiment, the already known function is a function that is described in the port monitor expansion file 412 or a function that is described in a file that can be read by the port monitor expansion file 412.

In step S505, the next generation application 401 calls the information transmission function. Then, the next generation application 401 terminates the processing of the flowchart illustrated in FIG. 5.

The information transmission function described in the present exemplary embodiment is the function usable in the Bidi Printer communication. By calling the information transmission function, the parameter including the schema having been set can be transmitted to the port monitor dedicated expansion file 412.

<Processing Relating to the Printer Maintenance Function A that can be Performed by the Port Monitor Dedicated Expansion File>

The port monitor dedicated expansion file 412 can be invoked after the next generation application 401 has called the information transmission function. Then, the operation proceeds to step S601.

In step S601, the port monitor dedicated expansion file 412 analyzes the received parameter. Then, the operation proceeds to step S602.

In step S602, the port monitor dedicated expansion file 412 identifies the type of the received parameter based on the analysis result. The port monitor dedicated expansion file 412 identifies the received parameter as an already known function name in the port monitor expansion file 412. Then, the operation proceeds to step S603.

In step S603, the port monitor dedicated expansion file 412 outputs the Binary type maintenance control command that corresponds to the received parameter, which is existing in the port monitor expansion file beforehand, to the USB port monitor 406. Then, the monitor dedicated expansion file 412 terminates the processing of the flowchart illustrated in FIG. 6.

The Binary type data existing in the port monitor expansion file beforehand is not limited to the maintenance control command. For example, the Binary type data existing in the port monitor expansion file may be a printer operation control command, which controls the ON/OFF of a power source of the printing apparatus 407 or the time setting of automatically turning on/off the power source of the printing apparatus 407.

Further, in a case where the printing apparatus 407 can accept a String type maintenance control command, the maintenance control command to be output to the USB port monitor 406 is not limited to the Binary type and can be the String type.

The USB port monitor 406 transmits the maintenance control command to the printing apparatus 407. The printing apparatus 407 executes the received maintenance control command.

As described above, the printing system can execute the maintenance function A in response to the execution of the button 712.

<Processing Relating to the Printer Maintenance Function B that can be Performed by the Next Generation Application>

If the button 713 is executed, then in step S501, the next generation application 401 determines whether the maintenance function to be executed is supported by the port monitor dedicated expansion file 412. When the maintenance function to be executed is the maintenance function B of the button 713, there is not any maintenance control command described beforehand in the port monitor expansion file 412 (NO in step S501). Therefore, the operation proceeds to step S503.

The determination in step S501 can be realized by determining whether the button instructed by a user is the button 712 or the button 713.

In step S503, the next generation application 401 sets the printer maintenance function B dedicated schema to the parameter. Then, the operation proceeds to step S504. The schema path of the printer maintenance function B dedicated schema having been set in this case includes an input of information indicating the direct transmission mode, which indicates sending the maintenance control command from the next generation application 401.

In step S504, the next generation application 401 performs processing for converting the maintenance control command dedicated to the printer maintenance function B stored in the next generation application 401 into String type data and setting the converted data to the Value of the schema in the parameter. An example method for converting the data into the String type in step S504 is described in detail below.

In step S505, the next generation application 401 calls the information transmission function. Then, the next generation application 401 terminates the processing of the flowchart illustrated in FIG. 5.

<Processing Relating to the Printer Maintenance Function B that can be Performed by the Port Monitor Dedicated Expansion File>

The port monitor dedicated expansion file 412 can be invoked after the next generation application 401 has called the information transmission function. Hereinafter, example processing that can be performed by the port monitor dedicated expansion file 412 is described below.

The descriptions of steps similar to those of already described steps are not repeated.

In step S602, the port monitor dedicated expansion file 412 identifies the type of the received parameter based on the analysis result. The port monitor dedicated expansion file 412 identifies the maintenance control command stored in the received parameter as the direct transmission mode. Then, the operation proceeds to step S604.

In step S604, the port monitor dedicated expansion file 412 converts the String type maintenance control command stored in the received parameter into the Binary type maintenance control command. Then, the operation proceeds to step S605. An example method for converting the String type maintenance control command into the Binary type in step S604 is described in detail below.

In step S605, the port monitor dedicated expansion file 412 outputs the converted Binary type maintenance control command to the port monitor. Then, the port monitor dedicated expansion file 412 terminates the processing of the flowchart illustrated in FIG. 6.

The USB port monitor 406 transmits the Binary type maintenance control command to the printing apparatus 407. The printing apparatus 407 executes the received maintenance control command.

As described above, the printing system can execute the maintenance function B in response to the execution of the button 713.

The maintenance control command held in the next generation application 401 may be the String type if the Binary type maintenance control command can be converted beforehand into the String type. In a case where the command held in the next generation application 401 is the converted maintenance control command, the next generation application 401 adds the String type maintenance control command to the parameter and calls the information transmission function, so that the port monitor dedicated expansion file 412 can process the maintenance control command. In this case, the next generation application 401 can skip the processing in step S504 (i.e., the conversion of the data into the String type).

<Differences Between the Already Known Function and the Direct Transmission Mode>

It is, for example, assumed that the file size of the port monitor dedicated expansion file 412 is limited due to environmental constraint of the information processing apparatus 110. In such a situation, the number of maintenance control commands that can be prepared beforehand in the port monitor dedicated expansion file 412, as the already known function, is limited. Accordingly, to prevent the size of the port monitor dedicated expansion file 412 from increasing, it is useful to prepare a representative maintenance control command common to a plurality of models of the printing apparatus, as the already known function, in the port monitor dedicated expansion file 412. In this case, a unique maintenance control command customized for each model of the printing apparatus is prepared in the next generation application 401.

<Example Data Conversion Between the Binary Type and the String Type>

Next, an example conversion of the data into the String type (i.e., the processing in step S504) to be performed by the next generation application 401 and an example conversion of the data into the Binary type (i.e., the processing in step S604) to be performed by the port monitor dedicated expansion file 412 are described in detail below.

In a conversion example described below, the command to be transmitted is a maintenance control command "@Cleaning."

In a case where the maintenance control command "@Cleaning" is transmitted, the Binary type data to be transmitted has the following 10-byte array.

In hexadecimal notation, the Binary type data can be expressed as "0x40, 0x43, 0x6c, 0x65, 0x61, 0x6e, 0x69, 0x6e, 0x67, 0x0a." In decimal notation, the Binary type data can be expressed as "64, 67, 108, 101, 97, 105, 110, 105, 103, 10." In step S504, the next generation application 401 performs processing for encoding the maintenance control command having the above-described byte array into String type data of two characters, for each byte, and converting the encoded data into an ASCII character code.

More specifically, the next generation application 401 divides each value by 16 to convert an obtained value into one character and the remainder into another character. The next generation application 401 repetitively performs similar conversion processing for all data to be transmitted.

A predetermined rule applied in this case is that two-digit values 10 to 15 are replaced by uppercase letters A to F, respectively. The next generation application 401 performs inverse transform processing for the Binary type data based on the predetermined rule.

For example, when the above-described algorithm is applied to the conversion from the Binary type data into the String type data, 64 is changed into 4,0 and 108 is changed into 6,C. The obtained data are stored as String type data.

The String type data obtained as a result of the conversion processing applied to the Binary type data in step S504 is "4, 0, 4, 3, 6, C, 6, 5, 6, 1, 6, E, 6, 9, 6, E, 6, 7, 0, A." The next generation application 401 sets the obtained String type data, as one-byte array, to the parameter.

As described above, it is feasible to perform the conversion from the Binary type data into the String type data.

Next, the String type data received by the port monitor dedicated expansion file 412 in step S604 is "52, 48, 52, 51, 54, 67, 54, 53, 52, 49, 54, 69, 54, 57, 54, 69, 54, 55, 48, 65" if it is expressed as a decimal number. In step S604, the port monitor dedicated expansion file 412 performs inverse transform processing on the received String type data to obtain Binary type data.

If the first character value is any one of 48("0") to 57("9"), the port monitor dedicated expansion file 412 subtracts 48 from the value. If the value is any one of 65 ("A") to 70("F"), the port monitor dedicated expansion file 412 subtracts 55 from the value. Then, the port monitor dedicated expansion file 412 sets the obtained values as an upper 4-bit data of one byte.

If the second character value is in any one of 48 to 57, the port monitor dedicated expansion file 412 subtracts 48 from the value. If the value is any one of 65 to 70, the port monitor dedicated expansion file 412 subtracts 55 from the value. Then, the port monitor dedicated expansion file 412 sets the obtained values as a lower 4-bit data of one byte.

For example, 0x40 can be obtained if a character string of 52 and 48 is inversely transformed and 0x6c can be obtained if a character string of 54 and 67 is inversely transformed.

If the conversion is completed for all of the character strings, a hexadecimal number "0x40, 0x43, 0x6c, 0x65, 0x61, 0x6e, 0x69, 0x6e, 0x67, 0x0a" can be obtained as a result of the inverse transform processing.

As described above, it is feasible to perform the inverse trans form processing to obtain the Binary type data from the received array of String type data.

The above-described inverse transform algorithm and the conversion between the Binary data and the String data are examples using the ASCII character code. By performing the above-described conversion, it is feasible to perform transmission and reception of Binary type data, for example, even in an environment where only ASCII character codes can be processed as String type data between programs.

In short, it is only required to perform the conversion according to a method determined beforehand between the next generation application 401 and the port monitor dedicated expansion file 412. It is needless to say that the conversion can be performed using another algorithm.

Further, the above-described mutual transformation between the Binary type data and the String type data is not limited to the conversion of the maintenance control command and can be effectively applied to all data.

Next, a modified example of the next generation application 401 is described with reference to FIG. 9 and FIG. 10.

FIG. 9 is a flowchart illustrating example processing to be performed to display the main screen when the next generation application 401 is launched.

In step S901, the next generation application 401 determines whether the driver usable when the next generation application 401 is launched is the next generation driver 410 or the legacy driver 210. As an example determination method, it is useful to classify printer driver names according to a predetermined rule or use the API of the OS that determines the structure of the printer driver if it is available. If it is determined that the usable driver is the next generation driver 410 (Yes in step S901), the operation proceeds to step S902. If it is determined that the usable driver is the legacy driver 210 (No in step S901), the operation proceeds to step S905.

In step S902, the next generation application 401 identifies the port connected to the next generation driver 410 and determines whether the identified port has the port monitor dedicated expansion file 412. If it is determined that the port connected to the printing apparatus 407 is the port that has the port monitor dedicated expansion file 412 (Yes in step S902), the operation proceeds to step S903. If it is determined that the identified port is not compatible with the port monitor dedicated expansion file 412 (No in step S902), the operation proceeds to step S905.

In step S903, the next generation application 401 determines whether transmitting information to the printing apparatus 407 is currently feasible. For example, the next generation application 401 can check if bidirectional communication information is transmissible in a print-in-progress state. If the port monitor cannot perform an exclusive control when the transmission of the bidirectional communication information is tried in the print-in-progress state, it has an adverse influence on the printing operation. Therefore, the next generation application 401 determines that transmitting information to the printing apparatus 407 is currently unfeasible. If it is determined that information can be currently transmitted to the printing apparatus 407 (Yes in step S903), the operation proceeds to step S904. If it is determined that transmitting information to the printing apparatus 407 is currently unfeasible (No in step S903), the operation proceeds to step S905.

In step S904, the next generation application 401 displays the maintenance function buttons on the main screen of the next generation application 401 (see a screen 1001 illustrated in FIG. 10) because the maintenance control command is transmittable to the printing apparatus 407.

In step S905, the next generation application 401 does not display any maintenance function button and displays only the executable function button because the maintenance control command cannot be transmitted to the printing apparatus 407. More specifically, only the printer manual display button can be displayed in this case (see a screen 1005 illustrated in FIG. 10).

Alternatively, it is useful to constantly display a "printer maintenance A" button 1003 and a "printer maintenance B" button 1004 (see the screen 1001 illustrated in FIG. 10). In this case, the next generation application 401 can perform the determination processing in step S901, step S902, and step S903 before performing the processing in step S501. If the button is executed by a user in a case where the maintenance control command cannot be transmitted to the printing apparatus, the next generation application 401 displays a screen 1007 illustrated in FIG. 10 on the GUI to inform the user of a current situation that the function is not executable, the reason thereof, and effective avoidance method.

When the above-described arrangement is employed, it becomes feasible to appropriately instruct execution of the maintenance function from the next generation application to a printing apparatus even in the environment illustrated in FIG. 4.

Further, in the present exemplary embodiment, the port monitor dedicated expansion file is stored as a text file that can be freely browsed by each user. Accordingly, the maintenance function can be executed even when the port monitor dedicated expansion file 412 does not include any maintenance control command. Thus, it is unnecessary to describe the maintenance control command in the text file. The confidentiality of the maintenance control command can be improved.

Further, as another effect, in a case where the next generation driver 410 is a printer driver that is incorporated beforehand in the OS and is a general driver that is usable in a future printing apparatus, if the maintenance control command exists beforehand in the port monitor dedicated expansion file 412, it is feasible to enhance the maintenance function so as to be compatible with the future printing apparatus 407.

Next, a print control method according to a second exemplary embodiment is described below with reference to FIGS. 11 to 13, in which an image file can be transmitted to the printing apparatus 407 using a next generation application 401 that can display an image file and the port monitor dedicated expansion file 412 of the next generation driver 410.

FIG. 11 illustrates an example screen configuration of the next generation application 401 that displays an image file. Main screens 1101 and 1104 can be displayed when the next generation application is launched.

It is feasible to open an image file, if it has an appropriate image file format (e.g., Joint Photographic Experts Group (JPEG), Tagged image File Format (TIFF), or Windows bitmap image (BMP)) stored in the information processing apparatus 110 when generated, and display the image file in an image display area 1102 or 1105 located at a central region of the main screen.

Further, as illustrated in FIG. 11, it is feasible to display a file name of the displayed image file in an upper display area 1103 or 1106 of the main screen 1101 or 1104.

Further, it is feasible to display a print button 1107 in a lower display area of the main screen 1101 or 1104. When the print execution button is pressed, the image file can be directly transmitted to the printing apparatus 407, using the port monitor dedicated expansion file 412 of the next generation driver 410.

As it is generally known, when an ordinary application executes print processing, the application performs rendering processing on image data according to the device resolution, using the graphics driver 411 of the next generation driver 410. Further, the application performs color processing and quantization processing on an obtained RGB image file and further performs conversion processing to obtain a printer control command. Finally, the application transmits the obtained print command to the printing apparatus 407.

Further, in a case where the printing apparatus 407 can directly receive an image file and can perform print processing, the graphics driver 411 of the next generation driver 410 converts the image file having been subjected to the rendering processing into an image file format that can be processed by the printing apparatus 407. Subsequently, the graphics driver 411 transmits the converted image file to the printing apparatus 407. The printing apparatus 407 directly processes the received image file and performs printing, as is generally known.

However, the above-described two printing methods are disadvantageous in that the number of data conversion operations increases and the processing load increases. Therefore, a significant long time is required to complete the processing for the information processing apparatus 110 that uses the powerless CPU 112. Further, it is general to perform the rendering processing with the corresponding resolution of the printing apparatus 407. Therefore, the processing will increase the usage amount of the RAM 116 of the information processing apparatus 110.

A print control method capable of reducing the processing load and the usage memory amount of the information processing apparatus 110, using a combination of the next generation application 401 illustrated in FIG. 4, the next generation driver 410, and the port monitor dedicated expansion file 412, is described below with reference to FIG. 12.

Figure 12:
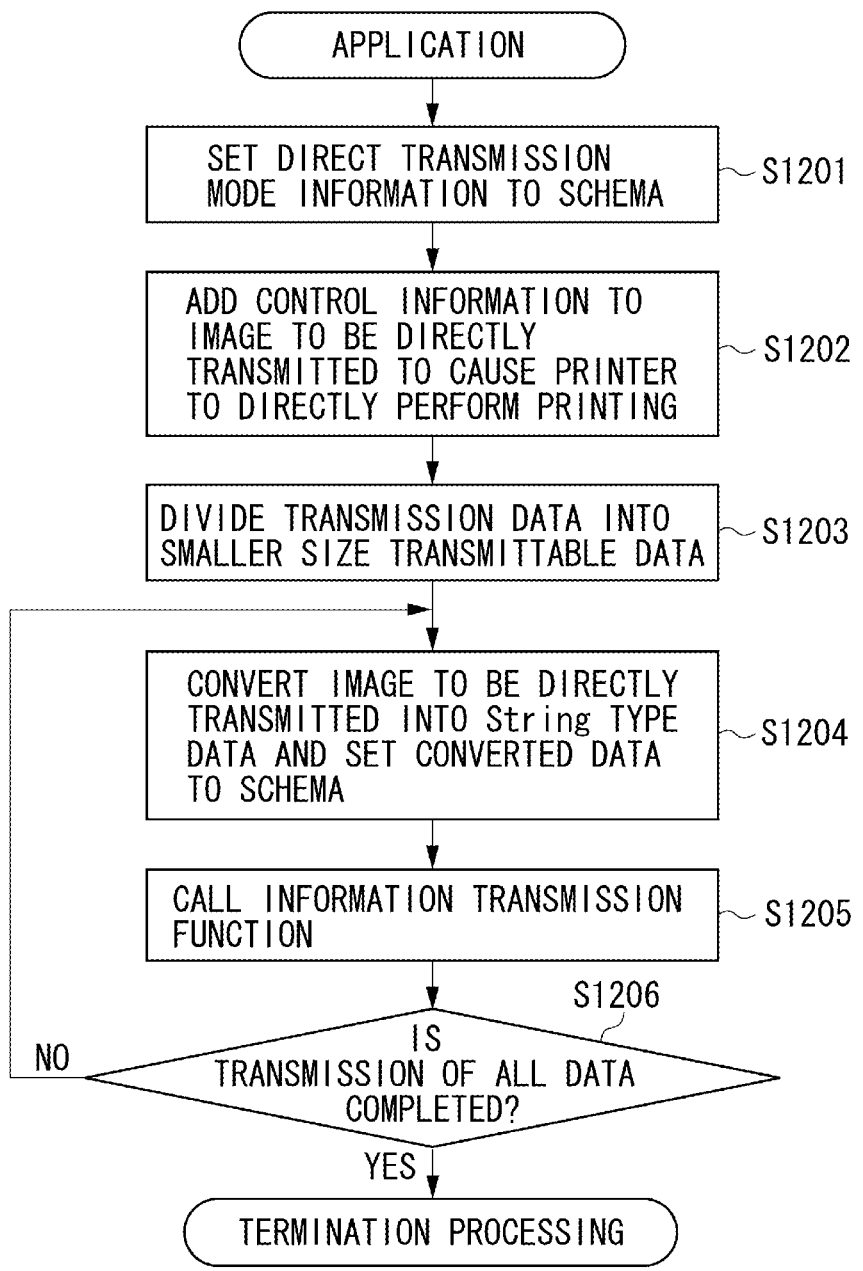
FIG. 12 is a flowchart illustrating example processing to be performed when the next generation application 401 transmits an image file to a printing apparatus 407.

FIG. 12 is a flowchart illustrating an example flow of processing to be performed when the next generation application 401 transmits an image file to the printing apparatus 407.

The next generation application 401 performs processing in step S1201 when the print button 1107 is pressed.

In step S1201, the next generation application 401 sets information indicating the direct transmission mode to a schema when the next generation application 401 performs bidirectional communications. Then, the operation proceeds to step S1202.

In step S1202, the next generation application 401 adds control information, which causes the printing apparatus 407 to directly receive and print an image file, to an image file to be transmitted. Then, the operation proceeds to step S1203. The control information is information required when the printing apparatus 407 performs processing for directly printing an image file.

In step S1203, the next generation application 401 confirms the size of the image file to be transmitted. The next generation application 401 divides the image file into a plurality of smaller size transmittable data. Then, the operation proceeds to step S1204.

Dividing an image file as described above is effective to surely transmit the image file even in a case where there is an upper limit with respect to the size of the data in the parameter to be transmitted or received using the Bidi Printer communication or the size of the data that can be received simultaneously by the printing apparatus 407.

In step S1204, the next generation application 401 converts the data of the divided image file into String type data and then sets the converted data to the schema in the parameter.

In step S1205, the next generation application 401 calls the information transmission function. If the next generation application 401 calls the information transmission function, the processing flow of the port monitor dedicated expansion file 412 illustrated in FIG. 6 is performed. The parameter includes a designation of the direct transmission mode. Therefore, when the conversion from the String type data into the Binary type data by the port monitor dedicated expansion file 412 is completed, the port monitor transmits the converted data to the printing apparatus 407.

In step S1206, the next generation application 401 determines whether the data transmission of the image file has been entirely completed. If it is determined that the data transmission has been entirely completed (Yes in step S1206), the next generation application 401 terminates the processing of the flowchart illustrated in FIG. 12. Further, if it is determined that the data transmission has not been entirely completed (No in step S1206), the next generation application 401 repetitively executes the above-described processing in step S1204 to step S1206.

The printing apparatus 407 processes the received image file and performs printing.

Figure 13:
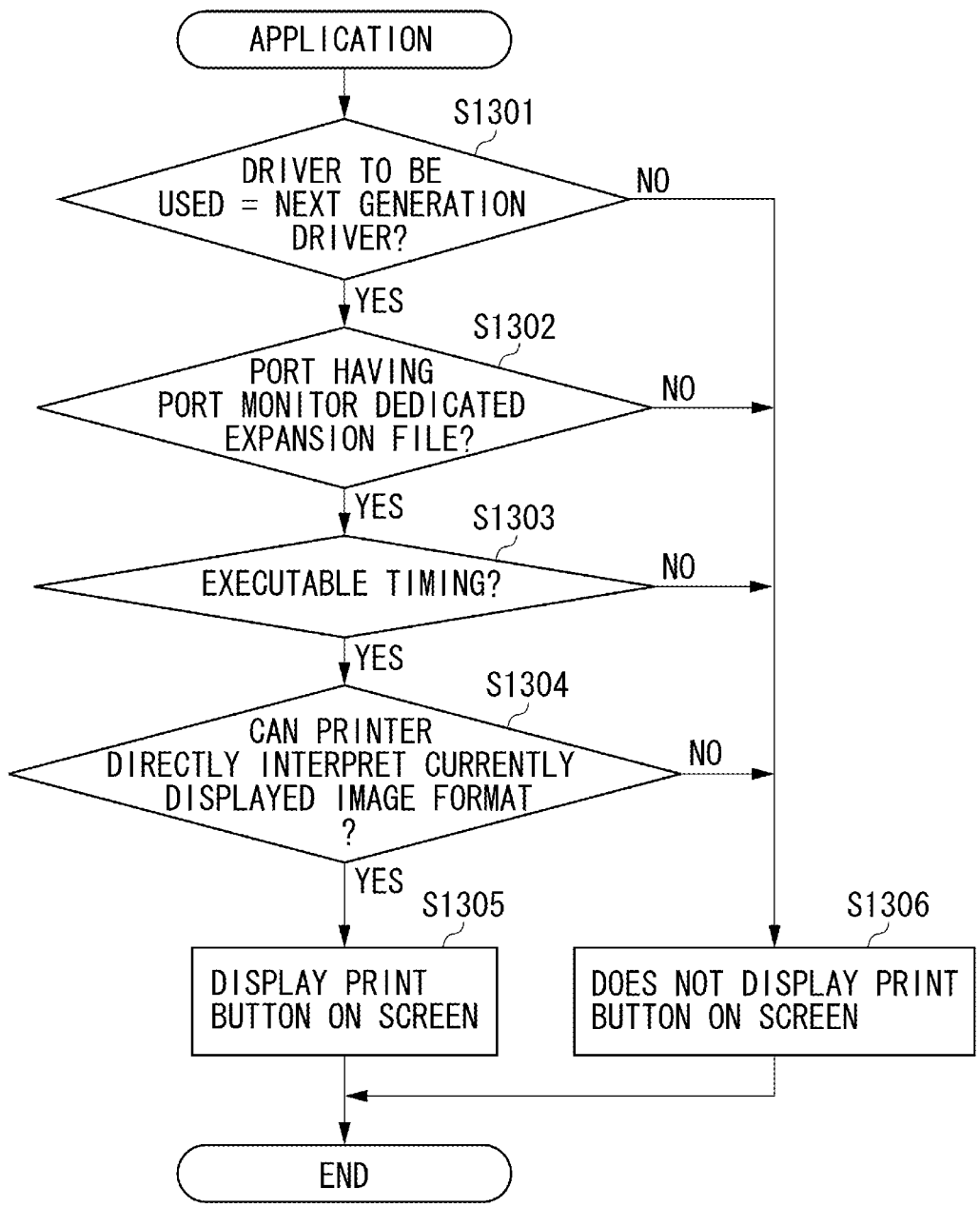
FIG. 13 illustrates an example flow of processing to be performed when the next generation application 401 is launched to display a print button 1107.

FIG. 13 illustrates an example flow of processing to be performed when the next generation application 401 is launched to display the print button 1107.

The port monitor dedicated expansion file 412 of the next generation driver 410 is requisite for a print function of the above-described next generation application 401. Therefore, it is desired to display the print button 1107 only when a user can uses the print function.

Processing to be performed in step S1301 is similar to the processing performed in step S901. Processing to be performed in step S1302 is similar to the processing performed in step S902. Processing to be performed in step S1303 is similar to the processing performed in step S903. Therefore, the descriptions thereof are omitted.

In step S1304, the next generation application 401 determines whether the image format of the currently displayed image file is a printable format that can be directly received by the printing apparatus 407. If it is determined that the image format of the currently displayed image file is directly receivable and printable by the printing apparatus 407 (YES in step S1304), the operation proceeds to step S1305. If it is determined that the format is not a printable image format (NO in step S1304), the operation proceeds to step S1306.

The following method is usable to identify the printable format in step S1304. First, the next generation application 401 stores a list of extensions printable by the printing apparatus 407, in the external storage device 115. Then, the next generation application 401 determines whether the format of the image file is included in the list. Alternatively, it is useful that the next generation application 401 inquires the printing apparatus 407 about the list of extensions printable by the printing apparatus 407.

In step S1305, namely in a state where the image format is directly transmittable to the printing apparatus, the next generation application 401 displays the print button 1107 illustrated in FIG. 11 on the main screen of the next generation application 401.

In step S1306, namely in a state where the image format is not directly transmittable to the printing apparatus, the next generation application 401 does not display any print button as illustrated in FIG. 11 (see 1101).

As described in the second exemplary embodiment, it is feasible to directly transmit image data to the printing apparatus 407 using a combination of the next generation application 401, the next generation driver 410, and the port monitor dedicated expansion file 412, and cause the printing apparatus 407 to perform print processing based on the received image data.

Further, it is unnecessary for the information processing apparatus 110 to transmit any image file whose format cannot be dealt by the printing apparatus 407.

Further, in a case where there is a plurality of applications capable of transmitting a parameter to the port monitor dedicated expansion file, it is useful that the first application is configured to transmit the parameter in the direct transmission mode and the second application is configured to transmit a parameter designating an already known function.

According to an aspect of the present invention, it becomes feasible to provide the program that is operable adequately in the above-described different environment.

The application in the above-described exemplary embodiment is an example application that can realize execution of a maintenance function and direct transmission of an image file. However, the application is not limited to the above-described example.

For example, embodiments of the present invention can be effectively realized by an arbitrary application that intends to directly transmit data to a printing apparatus in an environment in which the system according to the present exemplary embodiment is operable.

Further, the personal computer described in the above-described exemplary embodiment is a mere example of the information processing apparatus, and the information processing apparatus is not limited to the above-described example. For example, an embodiment of the present invention is applicable to an arbitrary terminal (e.g., a portable telephone, a digital versatile disk (DVD) video player, a game machine, a set-top box, an Internet appliance) to which a similar method is usable.

Further, the printer described in the above-described exemplary embodiment is a mere example of the printing apparatus. For example, an embodiment of the present invention is applicable to any other printing apparatuses, such as a copy machine, a facsimile machine, and a multifunction peripheral that is operable as a printer, a scanner, and a facsimile machine.

Further, the USB interface described in the above-described exemplary embodiment is a mere interface between the PC and the printing apparatus. The interface between the PC and the printing apparatus is not limited to the above-described example. For example, an embodiment of the present invention is applicable to any port for which a port monitor dedicated expansion file is usable when the next generation driver performs bidirectional communications with a printing apparatus.

It is needless to say that embodiments of the present invention can be realized by supplying a storage medium that stores software program codes that can realize the above-described functions of the exemplary embodiments to a system or an apparatus and causing a computer (or a CPU or a microprocessing unit (MPU)) of the system or the apparatus to read and execute the program codes stored in the storage medium.

In this case, the program codes themselves having been readout from the storage medium can realize the above-described functions of the exemplary embodiments. Embodiments of the claimed invention encompass the storage medium that stores the program codes.

The storage medium that supplies program codes is, for example, a flexible disk, a hard disk, a solid state drive (SSD), an optical disk, a magneto-optical disk, a compact disk read only memory (CD-ROM), a compact disk recordable (CD-R), a magnetic tape, a nonvolatile memory card, a ROM, or a DVD.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-034347 filed Feb. 20, 2012, which is hereby incorporated by reference herein in its entirety.

What is claimed is:

1. An information processing apparatus, comprising:
   a conversion unit configured to convert string type data into binary data;
   a determination unit configured to determine whether a parameter received from an application indicates a direct transmission mode; and
   a transmission unit configured to instruct transmitting the binary data converted by the conversion unit to a printing apparatus in a case where it is determined that the parameter indicates the direct transmission mode, and configured to instruct transmitting binary data that corresponds to the parameter to the printing apparatus in a case where it is not determined that the parameter indicates the direct transmission mode,
   wherein the application transmits the parameter indicating the direct transmission mode in a case where a maintenance function selected via a screen of the application is not supported by a printer driver.

2. The information processing apparatus according to claim 1, further comprising:
   a control unit configured to perform a display control of buttons operable to execute the maintenance function, in a case where a port that corresponds to the printing apparatus is a port that includes a port monitor dedicated expansion file, and not to perform the display control of the buttons operable to execute the maintenance function, in a case where the port that corresponds to the printing apparatus is a port that does not include any port monitor dedicated expansion file.

3. The information processing apparatus according to claim 1, wherein the binary data is an image file and the printing apparatus performs printing based on the image file.

4. The information processing apparatus according to claim 3, further comprising:
   a display unit configured to display a button operable to receive a print instruction of the image file from a user in a case where a port that corresponds to the printing apparatus is a port that includes a port monitor dedicated expansion file.

5. A control method, comprising:
   converting string type data included in a first parameter into binary data;
   determining whether a parameter received from an application includes a direct transmission mode; and
   instructing transmitting the converted binary data to a printing apparatus in a case where it is determined that the parameter indicates the direct transmission mode, and instructing transmitting binary data that corresponds to the parameter to the printing apparatus in a case where it is determined that the parameter indicates the direct transmission mode,
   wherein the application transmits the parameter indicating the direct transmission mode in a case where a maintenance function selected via a screen of the application is not supported by a printer driver.

6. The control method according to claim 5, further comprising:
   performing a display control of buttons operable to execute the maintenance function, in a case where a port that corresponds to the printing apparatus is a port that includes a port monitor dedicated expansion file, and not to performing the display control of the buttons operable to execute the maintenance function, in a case where the port that corresponds to the printing apparatus is a port that does not include any port monitor dedicated expansion file.

7. The control method according to claim 5, wherein the binary data is an image file and the printing apparatus performs printing based on the image file.

8. The control method according to claim 7, further comprising:
   displaying a button operable to receive a print instruction of the image file from a user in a case where a port that corresponds to the printing apparatus is a port that includes a port monitor dedicated expansion file.

9. A non-transitory computer readable storage medium storing a program that causes a computer to operate as:
   a conversion unit configured to convert string type data;
   a determination unit configured to determine whether a parameter received from an application indicates a direct transmission mode; and
   a transmission unit configured to instruct transmitting the binary data converted by the conversion unit to a printing apparatus in a case where it is determined that the parameter indicates the direct transmission mode, and configured to instruct transmitting binary data that corresponds to the parameter to the printing apparatus in a case where it is not determined that the parameter indicates the direct transmission mode,
   wherein the application transmits the parameter indicating the direct transmission mode in a case where a maintenance function selected via a screen of the application is not supported by a printer driver.

10. The non-transitory storage medium according to claim 9, wherein the program causes the computer to operate as a control unit configured to perform a display control of buttons operable to execute the maintenance function, in a case where a port that corresponds to the printing apparatus is a port that includes a port monitor dedicated expansion file, and not to perform the display control of the buttons operable to execute the maintenance function, in a case where the port that corresponds to the printing apparatus is a port that does not include any port monitor dedicated expansion file.

11. The non-transitory storage medium according to claim 9, wherein the binary data is an image file and the printing apparatus performs printing based on the image file.

12. The non-transitory storage medium according to claim 11, wherein the program causes the computer to operate as a display unit configured to display a button operable to receive a print instruction of the image file from a user in a case where a port that corresponds to the printing apparatus is a port that includes a port monitor dedicated expansion file.

* * * * *